United States Patent [19]

Lee

[11] Patent Number: 5,189,657
[45] Date of Patent: Feb. 23, 1993

[54] CIRCUIT FOR WRITING AND REPRODUCING A MODULATION SIGNAL ONTO WRITABLE OPTICAL DISK

[75] Inventor: Jae-Hong Lee, Suwon, Rep. of Korea

[73] Assignee: Samsung Electronics Co., Ltd., Suwon, Rep. of Korea

[21] Appl. No.: 531,525

[22] Filed: Jun. 1, 1990

[30] Foreign Application Priority Data

Jun. 3, 1989 [KR] Rep. of Korea ............... 1989-7647

[51] Int. Cl.$^5$ .................................................. G11B 7/00
[52] U.S. Cl. ................................................................. 369/59
[58] Field of Search .................... 369/59; 375/21, 110; 359/184-186

[56] References Cited

U.S. PATENT DOCUMENTS

| | | | |
|---|---|---|---|
| 2,464,667 | 3/1949 | Boosman et al. | 375/21 X |
| 4,397,042 | 8/1983 | Tsujii et al. | 375/110 X |
| 4,497,069 | 1/1985 | Fischer | 359/186 X |
| 4,583,211 | 4/1986 | Nishikawa et al. | 369/59 |
| 4,817,077 | 3/1989 | Ono | 369/59 X |
| 4,873,680 | 10/1989 | Chung et al. | 369/59 |
| 4,901,300 | 2/1990 | van der Zande et al. | 369/47 |

OTHER PUBLICATIONS

"Modulation Systems for Digital Audio Discs with Optical Read Out"; Immink, IEEE Int'l Conf. on Acoustics and Signal Processing, Mar. 30–Apr. 1, 1981 pp. 587–589.

*Primary Examiner*—David J. Severin
*Attorney, Agent, or Firm*—Robert E. Bushnell

[57] ABSTRACT

A circuit capable of simply writing a specified modulation signal, for example, eight to fourteen modulated signals onto a writable optical disk, by utilizing rising and falling edges of the signal. The circuit includes a first pulse generator for generating a first write pulse upon each rising edge of the first format of modulation signal; a second pulse generator for generating a second write pulse upon each falling edge of the first format of modulation signal; a gating circuit for providing either one of the first and second pulses, in sequence of occurrence, to a laser power controller, so as to enable to write the first format of modulation signal onto the disk; a signal reproducing circuit for reproducing the first format of modulation signal retrieved from the disk into the original modulation signal; and a switching circuit for selecting either one of the second type of reproduced modulation signal and output of the signal reproducing circuit for a demodulating circuit. The circuit makes it possible to write an EFM signal by two successive write pulses, irrespectively of the length of logic high duration of the EFM signal.

20 Claims, 5 Drawing Sheets

FIG. 1

FIG. 2A (SYSTEM CLOCK)

FIG. 2D (DATA FORMAT ON DISK)

FIG. 5A (SYSTEM CLOCK)
FIG. 5B
FIG. 5C
FIG. 5D
FIG. 5E
FIG. 5F DATA FORMAT ON DISK
FIG. 5G
FIG. 5H
FIG. 5I

CIRCUIT FOR WRITING AND REPRODUCING A MODULATION SIGNAL ONTO WRITABLE OPTICAL DISK

BACKGROUND OF THE INVENTION

The invention relates to an optical disk drive and, in particular, to a circuit for writing a given format of modulation signal onto an optical disk and reproducing the modulation signal therefrom.

Due to widened use of compact disks recently, the optical disk drive, i.e., the optical writing and reproducing system has enlarged its application area to a video system or an auxiliary memory in a computer, as well as an audio system. This trend is mostly caused by some excellent advantages of the optical disk drive that it is capable of writing information onto the optical disk and read out the information from the disk even without making any physical contact with the surface of the disk, and of storing onto a single optical disk a large amount of information up to more than several hundreds of Mega-bytes to Giga-bytes, as compared to traditional data media such as a magnetic audio or video tape, or any other data storage system.

Figure 1:
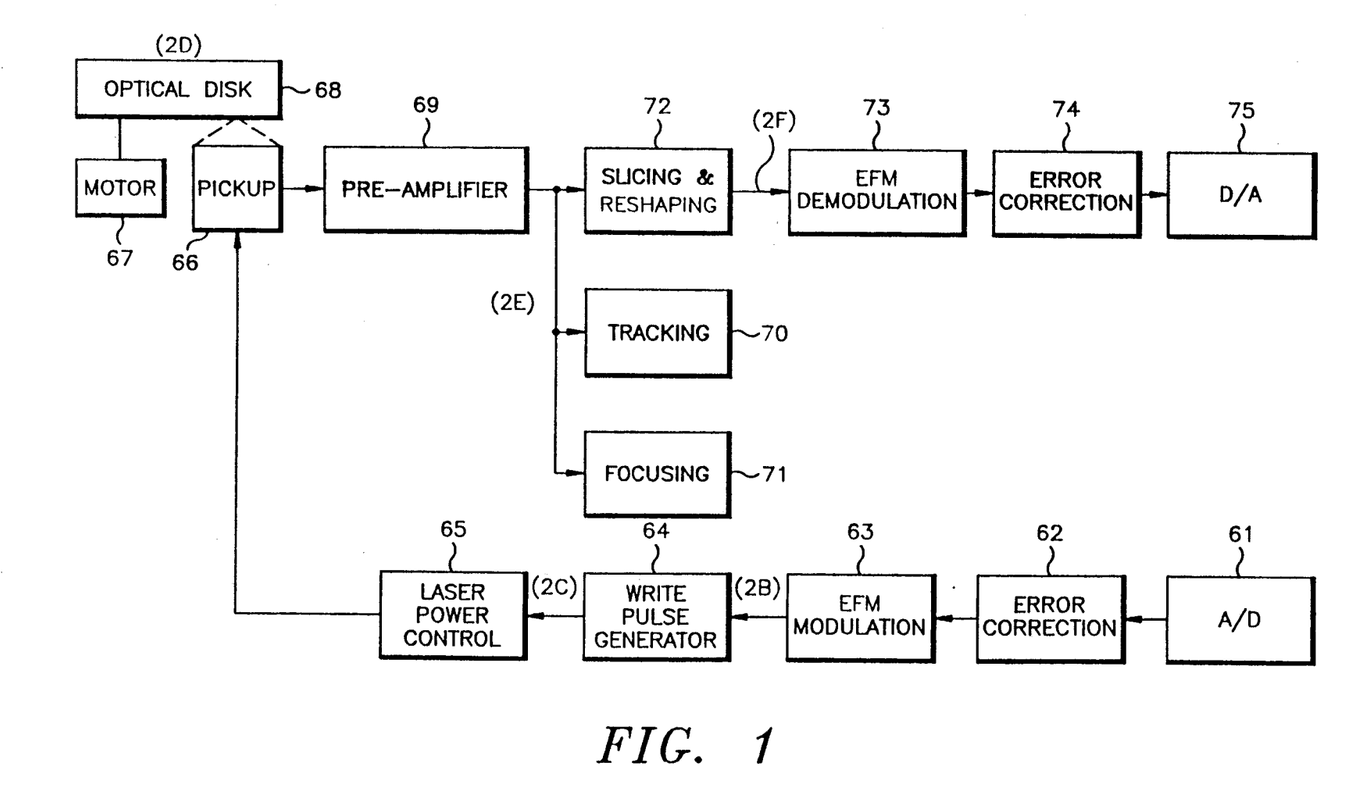
FIG. 1 is a schematic block diagram of one of known writable compact disk drive system.
Figure 2A:
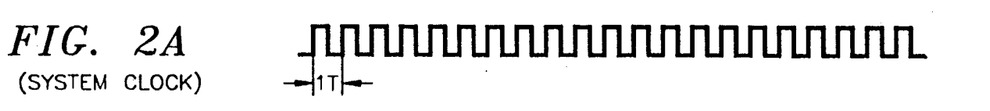
FIGS. 2A to 2F are waveforms according to the FIG. 1 block diagram.
Figure 2B:
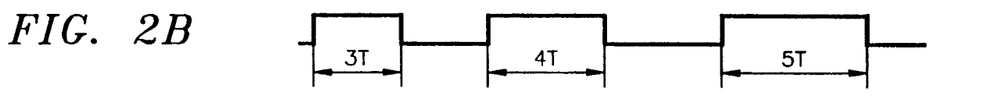
Figure 2C:
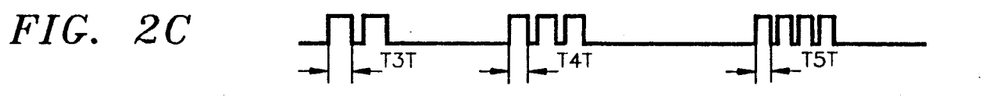
Figures 2D, 2E:
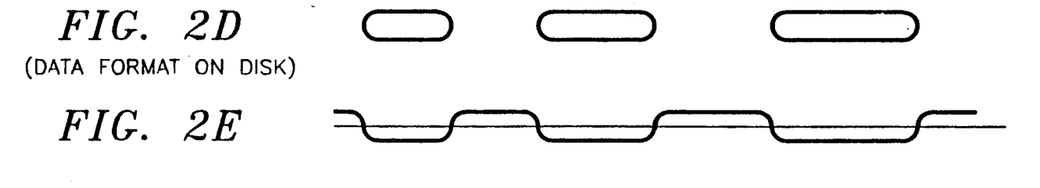
Figure 2F:
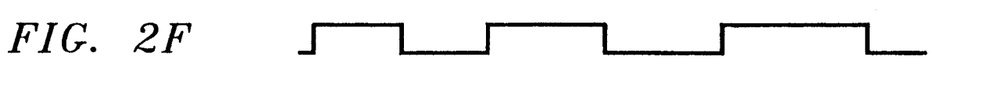

One known rewritable compact disk drive system is shown in a block diagram of FIG. 1, and part of various output waveforms therein are shown in FIGS. 2A to 2F, wherein FIG. 2A is a system clock. In write sequence, digital data from A/D converter 61 is made into an 8-bit signal with an error correction bit in an error correction circuit 62, which is applied to an eight-to-fourteen modulation (hereinafter referred to as EFM) circuit 63. Then, the 14-bit EFM signal of FIG. 2B is applied to a write pulse generator 64 from which output is sequentially written on the optical disk 68 through to a laser power controller 65 and a pickup 66. In the meantime, in read sequence the pickup reads out the written signal from the disk to convert the signal into an electrical signal and then deliver the signal into a pre-amplifier 69 for amplifying to an adequate level. The amplified analog signal is then applied into a slicing and reshaping circuit 72, a tracking circuit 70 and a focusing circuit 71. The analog signal of the pre-amplifier is digitized in the slicing and reshaping circuit and is then applied to an EFM demodulation circuit 73 to obtain a demodulated EFM signal, which is inputted to a D/A converter 75 through an error correction circuit 74.

In this optical reproducing system however, a number of the write pulse must be changed depending upon a duty period of logic high level of the EFM signal to be written onto the disk during the write operation. Moreover, the high period of the write pulse should be reduced as the number of the write pulse increases, so that there would be made no influence from any adjacent write pulses. Thus, such a limitation inevitably leads to a complicated circuit construction in the known optical disk drive system.

SUMMARY OF THE INVENTION

It is, therefore, an object of the present invention to provide a circuit capable of simply writing a specified modulation signal, for example, the EFM signal onto a writable optical disk, by utilizing a rising and falling edge of the signal.

It is another object of the present invention to provide a circuit for writing the EFM signal onto a writable optical disk and reproducing the same therefrom, with simplified circuit construction.

According to one aspect of the invention, the circuit includes: a first pulse generator for generating a first write pulse upon each rising edge of the first format of modulation signal; a second pulse generator for generating a second write pulse upon each falling edge of the first format of modulation signal; a gating circuit for providing either one of the first and second pulses, in sequence of occurrence, to a laser power controller, so as to enable to write the first format of modulation signal onto the disk; a signal reproducing circuit for reproducing the first format of modulation signal retrieved from the disk into the original modulation signal; and a switching circuit for selecting either one of the second type of reproduced modulation signal and output of the signal reproducing circuit to a demodulating circuit. The circuit makes it possible to write an EFM signal by two successive write pulses, irrespectively of the length of logic high duration of the EFM signal.

BRIEF DESCRIPTION OF THE DRAWINGS

For a better understanding of the invention and to show how the same may be carried into effect, reference will now be made, by way of example, to the accompanying diagrammatic drawings, in which.

DETAILED DESCRIPTION OF THE INVENTION

Figure 3A:
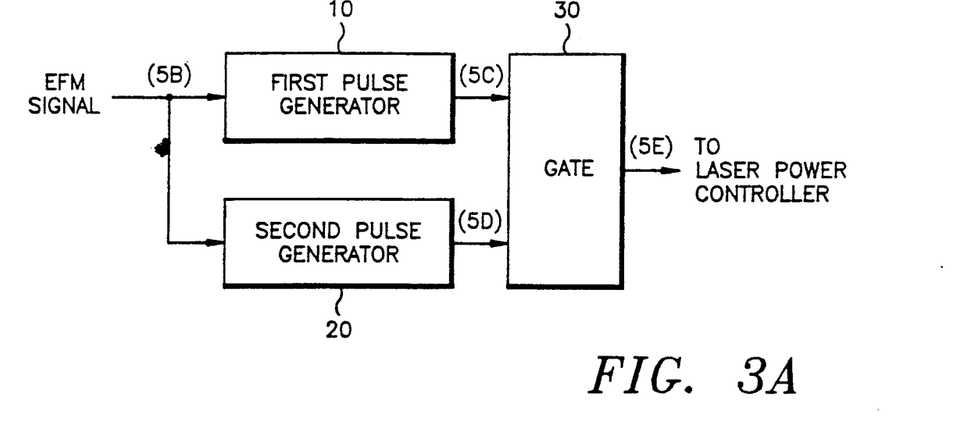
FIG. 3A is a block diagram of a write pulse generator according to the invention.
Figure 3B:
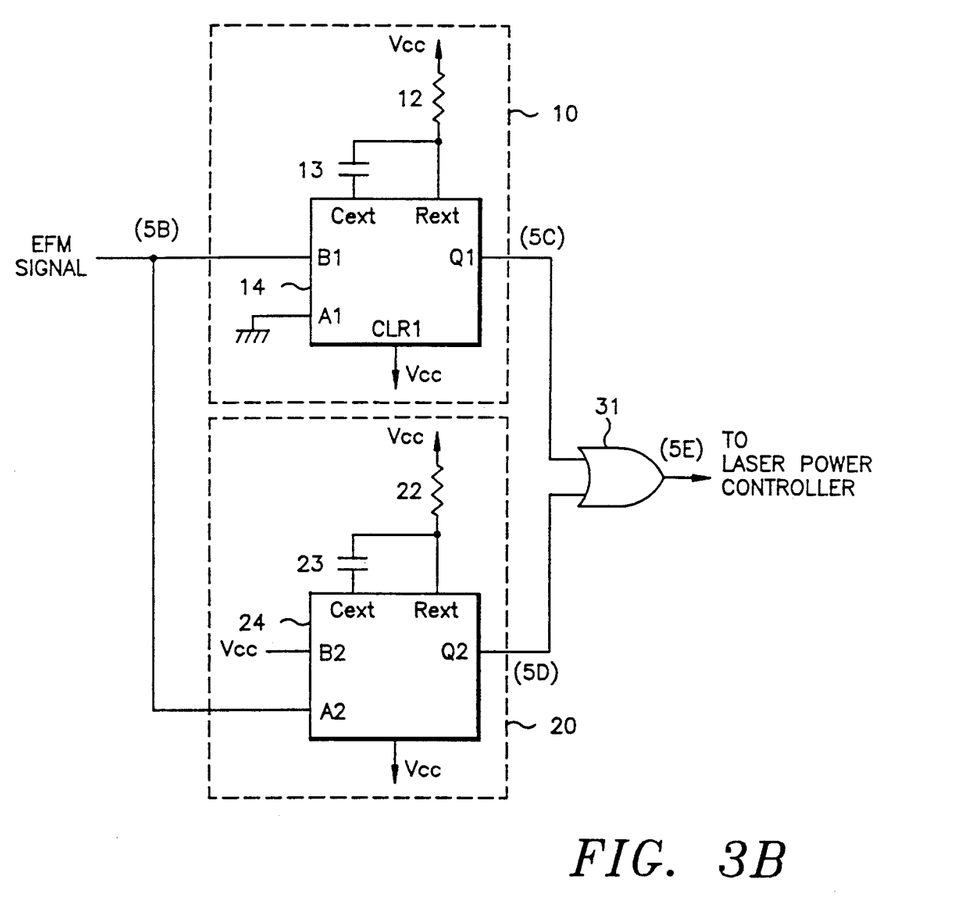
FIG. 3B is a circuit diagram of a preferred embodiment of FIG. 3A.

Referring to FIG. 3A, a block diagram for a write pulse generating circuit according to the invention is disclosed, and referring to FIG. 3B, a preferred embodiment circuit according to FIG. 3A is also disclosed. A first pulse generator 10 receives an EFM signal to generate a first write pulse upon every rising edge of the EFM signal, and has a mono-stable multivibrator 14, a resistor 12 and a capacitor 13 as shown by the construction of FIG. 3B. A second pulse generator 20 receives the same EFM signal to generate a second write pulse upon every falling edge of the EFM signal, and has a circuit construction with a mono-stable multivibrator 24, a resistor 22 and a capacitor 23 as shown by the drawing. A gate 30 receives the first and second write pulses, which are in sequence applied to a laser power controller of FIG. 1. An OR gate 31 having each input from the output of the mono-stable multivibrator 14 and 24 may constitute the gate circuit 30.

Figure 4A:
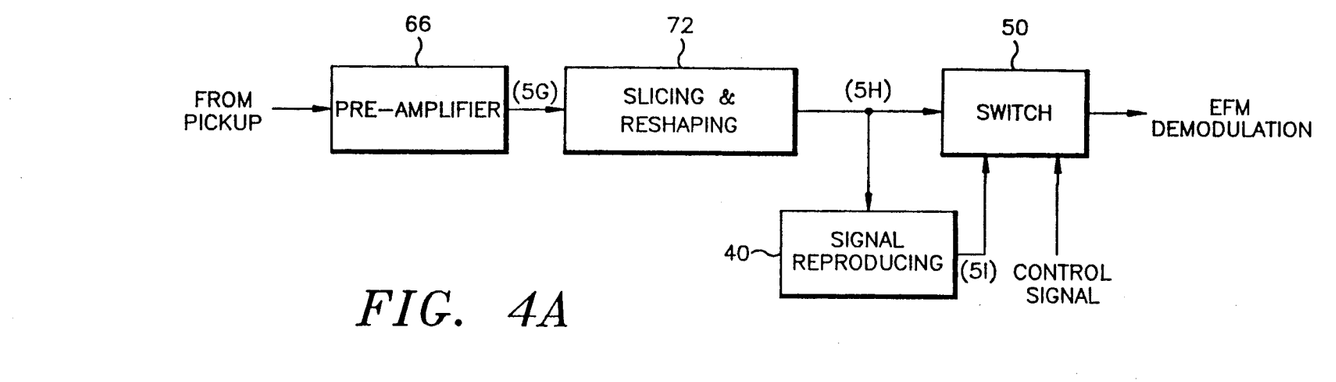
FIG. 4A is a block diagram of a portion of the present invention for reproducing data written onto an optical disk from the write pulse generator of FIG. 3A.
Figure 4B:
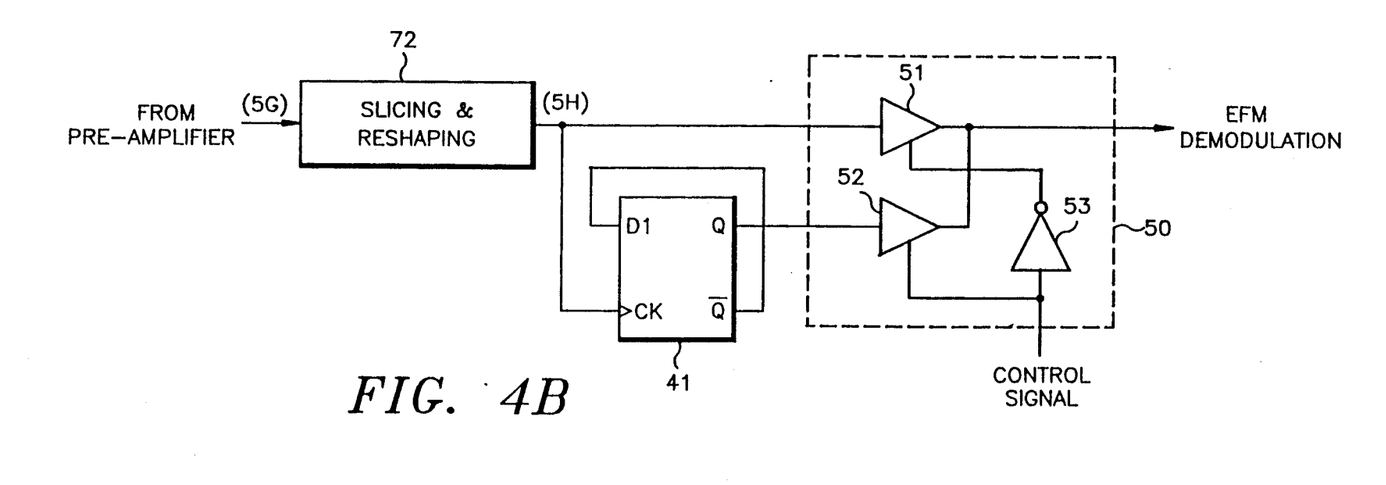
FIG. 4B is a circuit diagram of a preferred embodiment of FIG. 4A.

Referring to FIG. 4A, a block diagram of a circuit portion for reproducing the EFM signal written during the previous write operation, is disclosed, and further referring to FIG. 4B, a preferred embodiment circuit diagram of FIG. 4A is also disclosed. A signal reproducing circuit 40 receives a digital conversion signal from a slicing and reshaping circuit 72 coupled with a pre-amplifier 69, the digital conversion signal being divided by two, in frequency, to reproduce an original EFM signal written on the disk during a write operation. A switching circuit 50 receives the output of the signal reproducing circuit 40 and the digital conversion signal of the slicing and reshaping circuit 72. In response to the state of an external control signal, the switching circuit operates to provide an EFM demodulation circuit 73 with the Q output of the signal reproducing circuit 40. The signal reproducing circuit 41 may by constructed with a Flip-Flop 41 as shown by FIG. 4B, while the switching circuit 50 with tri-state buffer 51, 52 and an inverter 53 as shown by the same drawing, wherein the inverter 53 receives the external control signal and delivers its output into a control input of the buffer 51.

Figure 5A:
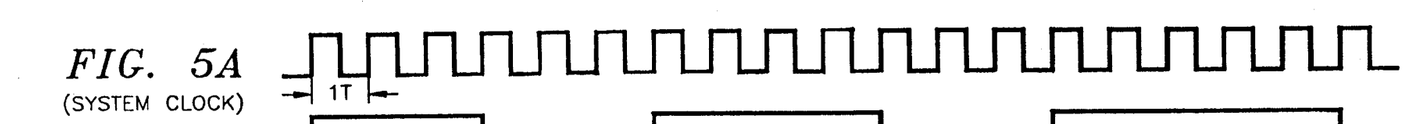
FIGS. 5A to 5I are waveforms for illustrating the operation according to the circuit of FIGS. 3B and 4B.
Figures 5B, 5C, 5D, 5E:
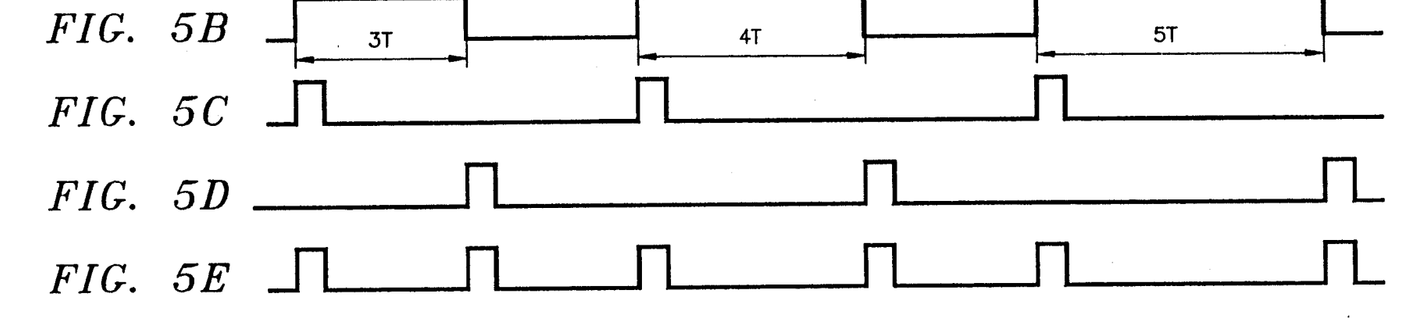
Figures 5F, 5G:
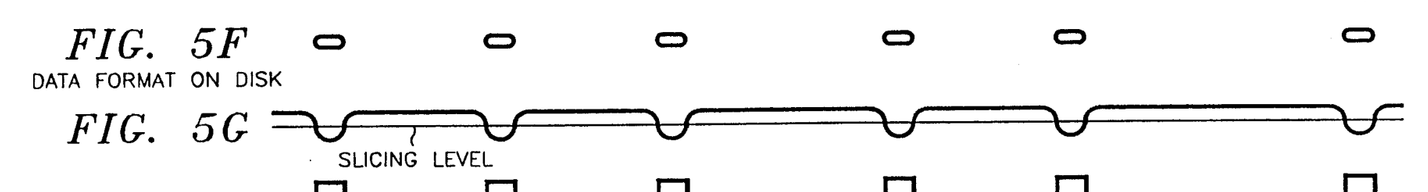

Hereinafter, the operation of the embodiment of the present invention represented by the circuit heretofore described, will be explained with specific reference to the drawings. During the write cycle of the EFM signal, the EFM modulation circuit 63 generates an EFM signal of FIG. 5B and the first and second pulse generator 10, 20 generate, in response to the EFM signal, a first write pulse of FIG. 5C on its rising edge, and a second write pulse of FIG. 5D, respectively. Since an input port A1 of the first mono-stable multivibrator 14 is grounded, and its other input port B1 is connected to the EFM signal of the EFM modulation circuit 63, the first write pulse of FIG. 5C is generated upon the rising edge of the EFM signal. Here, "high" duty period of this first write pulse is determined by a time constant with the resistor 12 and the capacitor 13 coupled with a source voltage Vcc. The operation and construction of the second mono-stable multivibrator 24 is totally the same as that of the first mono-stable multivibrator 14 described above. These first and second write pulses are logically operated in the OR gate 31 performing a kind of multiplexing function to obtain a pulse signal of FIG. 5E, which is written onto the optical disk 68 as shown by FIG. 5F.

Now, referring to the reproducing sequence of the digital data written onto the disk to obtain the original EFM signal, the following sequence is carried out with reference to the FIG. 4A. Pickup 66 reads out the digital data of FIG. 5F, which is amplified to a given level through the pre-amplifier 69, as shown in FIG. 5G. This reproduced signal is converted by the slicing and reshaping circuit, to obtain a proper digital signal. Then, the signal reproducing circuit 40 divides the digital signal by two in frequency, to thereby provide the switching circuit 50 with a digital signal of FIG. 5I, which has the same frequency as the original EFM signal. The switching circuit 50 selects either one of the digital signals shown in FIGS. 5H and 5I, and thereafter delivers the one signal to the EFM demodulation circuit 73.

Figures 5H, 5I:
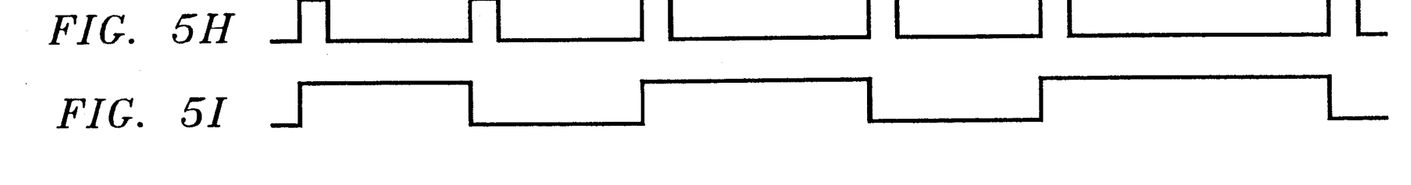

In the meantime, when the EFM signal written onto the disk 68 is of the first format of data, a system controller of the disk drive generates a control signal of logic high level, which turns on the tri-state buffer 52 to thereby select the output of the signal reproducing circuit 40, wherein the D-type flip-flop 41 divides by two the frequency of the output of the slicing and reshaping circuit 72 shown by the FIG. 5H waveform. However, when the EFM signal written onto the disk 68 is of the second, that is, conventional format of data, the system controller generates a control signal of logic low level, which turns on the tri-state buffer 51 to thereby select the output of the D flip-flop 41.

As described heretofore, the invention enables generations of a first type of write pulse upon the rising edge of the EFM signal, as well as a second type of write pulse upon its falling edge, and to write the write pulse onto the optical disk. Therefore, irrespectively of the length of a "high" duration of the EFM signal, two types of write pulses are effectively recorded on the disk, which makes it possible to achieve considerable simplification of circuit construction. Moreover, the two types of write pulses according to both the invention and the known system can be reproduced by a signal circuit of the invention, which enables much compatibility between a rewritable optical disk and a compact disk.

Although specific construction and procedures of the invention have been illustrated and described herein, it is not intended that the invention be limited to the elements and construction disclosed. One skilled in the art will easily recognize that the particular elements or stages of the circuits disclosed may be used without departing from the scope and spirit of the invention.

What is claimed is:

1. A circuit for writing data representative of digital signals, said digital signals representative of a first format of modulated signals, onto a disk medium, and thereafter, providing for output, reproductions of said first format of modulated signals or said digital signals, according to system control signals, said circuit comprising:

first pulse generator means for generating first write pulses in response to each rising edge of said first format of modulated signals;

second pulse generator means for generating second write pulses in response to each falling edge of said first format of modulated signals;

gating means for sequentially providing said first and second write pulses to a laser power controller, so as to enable writing of data representative of said digital signals onto the disk medium;

means for reading said data on said disk medium and for reproducing said digital signals represented by said data;

signal reproducing means for receiving the reproduced digital signals and for generating reproductions of said first format of modulated signals by converting the reproduced digital signals into said reproductions of said first format of modulated signals; and switching means for selecting either said reproductions of said first format of modulated signals or said reproduced digital signals, for output to a demodulator in response to said system control signals.

2. The circuit according to claim 1, further comprising means for converting analog data signals into digital data signals; and means for converting said digital data signals into said first format of modulated signals, wherein said first format of modulated signals is an eight-to-fourteen modulation signal.

3. The circuit according to claim 1, wherein said signal reproducing means comprises means for dividing frequency of said reproduced digital signals by two.

4. The circuit according to claim 1, wherein:

said first pulse generator means comprises a first mono-stable multivibrator having a first input port coupled to a reference potential, a second input port coupled to receive said first format of modulated signals, and an output port coupled to provide said first write pulses to said gating means; and said second pulse generator means comprises a second monostable multivibrator having a second input port coupled to a source potential, a first input port coupled to receive said first format of modulated signals, and an output port coupled to provide said second write pulses to said gating means.

5. The circuit according to claim 1, wherein said signal reproducing means comprises a bistable multivibrator having a clock terminal coupled to receive said reproduced digital signals and an output terminal coupled to said switching means.

6. The circuit according to claim 1, wherein said gating means comprises an OR gate.

7. The circuit according to claim 1, wherein said switching means comprises:
inverter means for inverting said system control signals;
first buffer means for conducting said reproductions of said first format of modulated signals to the demodulator in response to high logic values of said system control signals; and
second buffer means for conducting said reproduced digital signals to the demodulator in response to high logic values of the inverted system control signals.

8. The circuit according to claim 7, wherein:
said first pulse generator means comprises a first mono-stable multivibrator having a first input port coupled to a reference potential, a second input port coupled to receive said first format of modulated signals, and an output port coupled to provide said first write pulses to said gating means; and
said second pulse generator means comprises a second monostable multivibrator having a second input port coupled to a source potential, a first input port coupled to receive said first format of modulated signals, and an output port coupled to provide said second write pulses to said gating means.

9. The circuit according to claim 7, wherein said signal reproducing means comprises means for dividing frequency of said reproduced digital signals by two.

10. The circuit according to claim 9, wherein:
said first pulse generator means comprises a first mono-stable multivibrator having a first input port coupled to a reference potential, a second input port coupled to receive said first format of modulated signals, and an output port coupled to provide said first write pulses to said gating means; and
said second pulse generator means comprises a second monostable multivibrator having a second input port coupled to a source potential, a first input port coupled to receive said first format of modulated signals, and an output port coupled to provide said second write pulses to said gating means.

11. A circuit for writing data representative of a first format of modulated signals onto a disk medium and thereafter reproducing said first format of modulated signals or producing a second format of modulated signals, comprising:

means for writing said data onto the disk medium in response to a first write pulse corresponding to each rising edge of said first format of modulated signals and a second write pulse corresponding to each falling edge of said first format of modulated signals;

means for reading said data on said disk medium and for producing said second format of modulated signals;

signal reproducing means for receiving second formats of modulated signals produced from the disk by said means for reading and producing, and for generating reproductions of said first format of modulated signals by converting the produced second format of modulated signals; and switching means for selecting either said produced second format of modulated signals or said reproductions of said first format of modulated signals for output to a demodulator.

12. The circuit as claimed in claim 11, wherein said first format of modulated signals is an eight-to-fourteen modulation signal.

13. The circuit as claimed in claim 11, wherein said switching means comprises:
first means for conducting said reproductions of said first format of modulated signals to said demodulator;
second means for conducting said produced second format of modulated signals to said demodulator; and
means for applying a control signal and a complementary control signal to said first and second conducting means, respectively, for enabling said first or second conducting means to conduct only when control signal or said complementary control signal has a high logic value, respectively.

14. The circuit as claimed in claim 11, wherein said signal reproducing means comprises means for dividing frequency of said produced second format of modulated signals by two to reproduce said first format of modulated signals.

15. The circuit as claimed in claim 11, wherein said writing means comprises:
a laser power controller;
gating means for sequentially providing said first and second pulses to said laser power controller, to enable said data to be written onto the disk medium;
a first mono-stable multivibrator having a first input port coupled to a reference potential, a second input port coupled to receive said first format of modulated signals, and an output port coupled to provide said first write pulses to said gating means; and
a second monostable multivibrator having a second input port coupled to a source potential, a first input port coupled to receive said first format of modulated signals, and an output port coupled to provide said second write pulses to said gating means.

16. The circuit as claimed in claim 11, further comprised of gating means for sequentially providing said first and second write pulses to said means for writing, to enable said data to be written onto the disk medium.

17. The circuit as claimed in claim 16, wherein said signal reproducing means comprises means for dividing frequency of said produced second format of modulated signals by two to reproduce said first format of modulated signals.

18. The circuit as claimed in claim 16, wherein said switching means comprises:
   first means for conducting said reproductions of said first format of modulated signals said demodulator;
   second means for conducting said produced second format of modulated signals to said demodulator; and
   means for applying a control signal and a complementary control signal to said first and second conducting means, respectively, for enabling said first or second conducting means to conduct only when control signal or said complementary control signal has a high logic value, respectively.

19. The circuit as claimed in claim 18, wherein said signal reproducing means comprises means for dividing frequency of said produced second format of modulated signals by two to reproduce said first format of modulated signals.

20. The circuit as claimed in claim 18, wherein said writing means comprises:
   a laser power controller;
   gating means for sequentially providing said first and second pulses to said laser power controller, to enable said data to be written onto the disk medium;
   a first mono-stable multivibrator having a first input port coupled to a reference potential, a second input port coupled to receive said first format of modulated signals, and an output port coupled to provide said first write pulses to said gating means; and
   a second monostable multivibrator having a second input port coupled to a source potential, a first input port coupled to receive said first format of modulated signals, and an output port coupled to provide said second write pulses to said gating means.

* * * * *

UNITED STATES PATENT AND TRADEMARK OFFICE
CERTIFICATE OF CORRECTION

PATENT NO. : 5,189,657
DATED : 23 February 1993
INVENTOR(S) : Jae-Hong LEE

It is certified that error appears in the above-indentified patent and that said Letters Patent is hereby corrected as shown below:

Column 1,

Line 11,    before "use", change "widened" to --the widespread--, Column 3,     Line 24-25,    after "pulse', change "generator" to --generators--, Column 4,     Line 4-5,    after "enables", change "generations" to --generation--:

Signed and Sealed this

Sixth Day of August, 1996

Attest:

BRUCE LEHMAN

*Attesting Officer*      *Commissioner of Patents and Trademarks*